H. H. RODGERS.
CONTROLLING LEVER LOCKING MEANS FOR WARPING MACHINES.
APPLICATION FILED JULY 7, 1917.
1,248,920.
Patented Dec. 4, 1917.
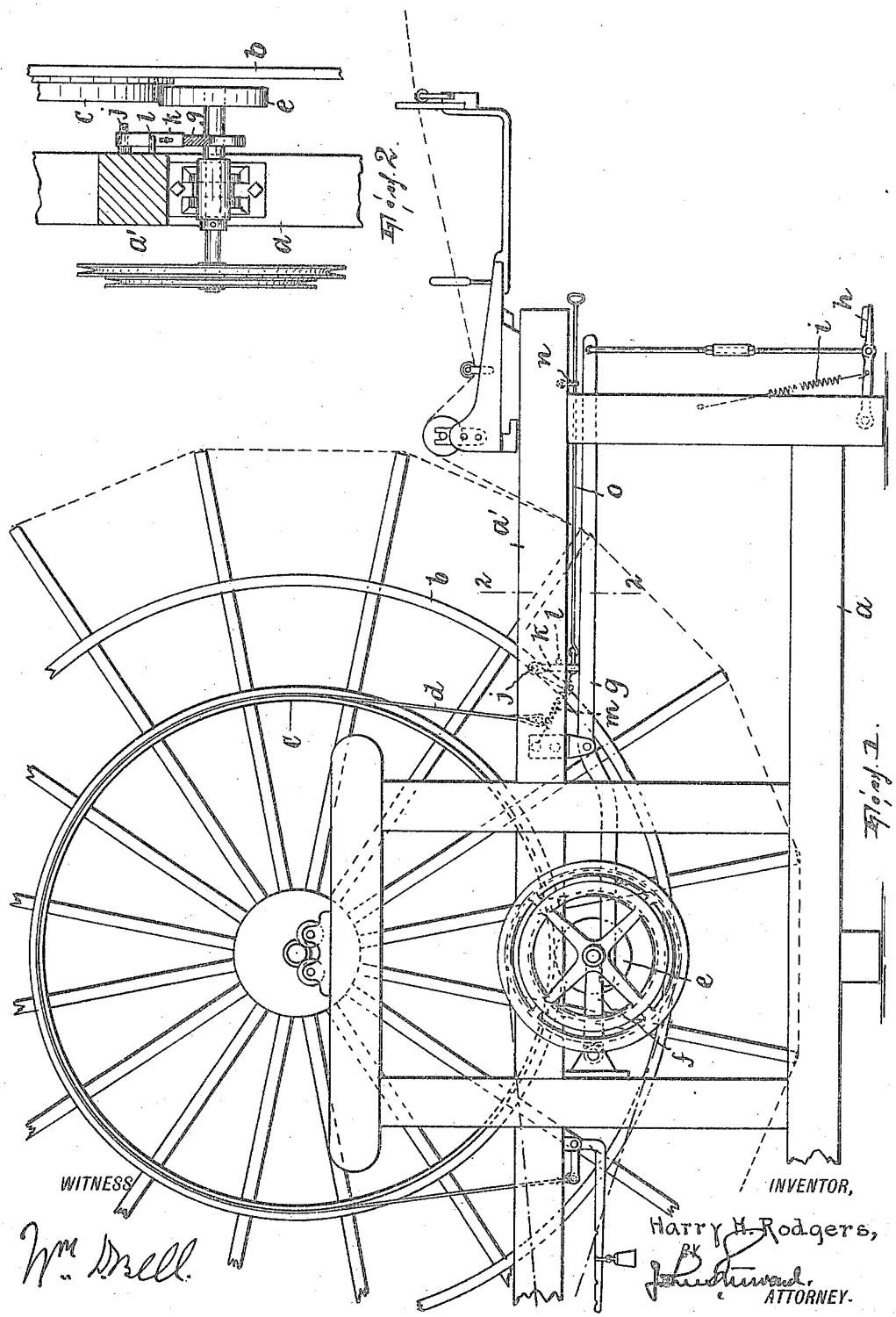
WITNESS
Wm Snell
INVENTOR,
Harry H. Rodgers,
BY
ATTORNEY.

UNITED STATES PATENT OFFICE.

HARRY H. RODGERS, OF PATERSON, NEW JERSEY.

CONTROLLING-LEVER-LOCKING MEANS FOR WARPING-MACHINES.

1,248,920.  Specification of Letters Patent.  Patented Dec. 4, 1917.

Application filed July 7, 1917. Serial No. 179,210.

*To all whom it may concern:*

Be it known that I, HARRY H. RODGERS, a citizen of the United States, residing at Paterson, in the county of Passaic and State of New Jersey, have invented certain new and useful Improvements in Controlling-Lever-Locking Means for Warping-Machines, of which the following is a specification.

In a certain type of warping machine, known as a horizontal warping machine, the rotary reel is driven by a rotary driving member, itself suitably driven, as by a belt, which is shiftable into and out of engagement with the reel by means of a lever having connected therewith a foot treadle. At present the warper is required to hold the treadle depressed with his foot at all times when the reel is to be kept rotating, though occasionally he could well afford to relax his attention to the reel and leave it running in order to give attention to some other duty. The object of this invention is to provide a chocking means to retain the driving member in driving relation to the reel which shall be at once simple in construction, readily accessible to the operator and capable of quickly and surely releasing the driving member when the reel is to be stopped.

In the accompanying drawing,

Figure 1 is a side elevation of a warping machine provided with my improvement, and Fig. 2 is a vertical sectional view on line 2—2 of Fig. 1.

$a$ designates the frame of the warping machine, $b$ the reel journaled therein, $c$ the driving-band of the reel, $d$ the usual brake-strap extending around the driving-band, $e$ the driving member adapted to bear against the driving-band to rotate the reel, being suitably continuously driven by a belt (not shown) and journaled in an arm $f$ pivoted to the frame, and $g$ the lever for raising member $e$ against the action of gravity into contact with the reel driving-band, said lever being fulcrumed in the frame and having the foot-treadle $h$ suitably connected with its free end.

To cause rotation of the reel the operator depresses the treadle with his foot, which moves the rotating driving member $e$ into contact with the driving-band; on releasing the pressure on the treadle the driving member is withdrawn from the driving-band by a spring $i$ connected with the treadle, and the brake-strap brings the reel to a stop. While it is desirable that usually the turning of the reel should be under the operator's immediate control, still there are times when he might leave the machine running to attend to some other duty. The improved chocking mechanism, adapted to hold the driving member in contact with the driving-band of the reel, is so constructed that in order to stop the machine quickly the operator actuates that element which is most convenient and which it is most natural for him to actuate, to wit, the treadle.

The lever $g$ extends horizontally close to and parallel with and below the side-rail $a'$ of the frame of the machine. On a pin $j$ projecting inwardly from said side-rail and horizontally is pivoted the dog or chock $k$, depending from said pin. The chock is capable of backward movement on its pivot pin but it cannot move forward beyond the vertical position, its movement in that direction being limited by a stop $l$ on side-rail $a'$. It directly overlies the lever $g$ and is of such length that when it stands vertically, abutting said stop $l$, the lever is held depressed thereby, the driving member being then in driving contact with the driving-band of the reel. A light spring $m$, connecting the chock with the frame $a$, serves to withdraw the chock to the dotted-line position shown in Fig. 1, normally holding it in that position; but when it is in chocking relation to the lever the friction between the lever and chock, augmented by the pressure of the lever incident to its being sprung somewhat in order to admit the chock to vertical position, prevents its swinging back clear of the lever.

A guide $n$ is attached to the side-rail $a'$ and in this slides an operating rod $o$ which is connected at one end to the chock and at the other reaches to the free end of the lever $g$. This arrangement, as will appear, is a matter of considerable convenience to the operator.

In order to set and leave the reel running the operator depresses the treadle and while he is holding it depressed pulls forward on the rod $o$ so as to move the chock to chocking position. Notwithstanding the pull of spring $m$ the chock remains in that position due to the upward pressure thereon of the lever $g$. When it is necessary to stop the reel the operator simply depresses the treadle, sufficiently to eliminate the friction between the lever and chock and allow the latter to be withdrawn by its spring, and then releases the lever; in other words, a touch of the treadle with the operator's foot is all that is needed to accomplish practically instantaneous stopping of the reel.

Having thus fully described my invention what I claim and desire to secure by Letters Patent is:

In combination, with the frame and the part to be shifted, normally retracted means to shift said part including a lever fulcrumed in the frame and engaging said part and a treadle connected to the lever, a chock movable in the frame into and out of chocking relation to said means and normally held out of said relation, and a rod to draw the chock into chocking relation connected to the chock and slidable in the frame and having a handle near the point of connection of the treadle with the lever.

In testimony whereof I affix my signature.

HARRY H. RODGERS.

Copies of this patent may be obtained for five cents each, by addressing the "Commissioner of Patents, Washington, D. C."